Feb. 11, 1930.  M. McM. KNECHTEL  1,746,537
PLOTTING INSTRUMENT
Filed Feb. 2, 1928
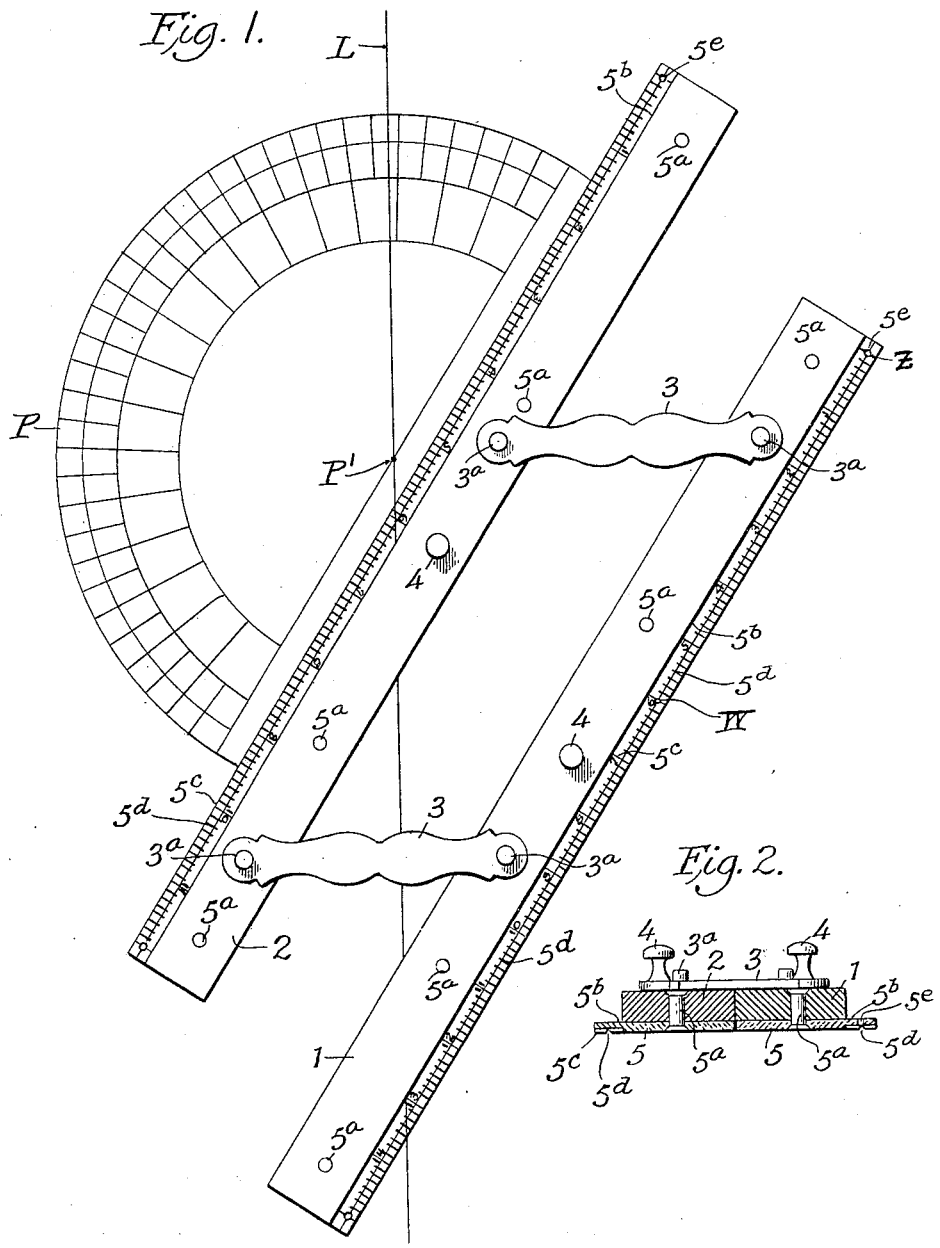
INVENTOR.
Maxwell McM. Knechtel
BY
ATTORNEYS Patented Feb. 11, 1930

1,746,537

UNITED STATES PATENT OFFICE

MAXWELL McM. KNECHTEL, OF NEW YORK, N. Y.

PLOTTING INSTRUMENT

Application filed February 2, 1928. Serial No. 251,317.

This invention is an improvement in plotting instruments of the parallel ruler type and the principal object of the invention is to provide a novel improved parallel ruler adapted to be conveniently used with an ordinary protractor by navigators, civil-engineers, surveyors, draftsmen and others whereby distances and directions from various points may be conveniently and accurately plotted with a minimum of effort.

My novel parallel ruler will be found particularly adapted for use with a protractor in plotting a survey traverse where a number of bearings and distances are to be plotted; also for use in connection with the well-known plane-table alidade. My invention however obviously is capable of other uses than those above specified.

I will explain the invention with reference to the accompanying drawing which illustrates one practical embodiment thereof to enable others to adopt and use the same; and will summarize in the claims the novel features of construction, and novel constructions of parts for which protection is desired.

In said drawings:—

Figure 1 is a plan view of the instrument showing same in use with an ordinary protractor.

Fig. 2 is a transverse section through the parallel rulers, drawn together.

As shown, my novel plotting instrument preferably comprises a pair of parallel rulers 1 and 2 connected together by means of a pair of parallel angularly disposed links 3 which are pivotally connected as at 3ª to the rulers 1 and 2 and adapted to retain the rulers constantly parallel while permitting separation of the rulers in the plane of their faces.

Suitable knobs 4 may be provided on the rulers 1 and 2 for adjusting and shifting them.

On the lower face of each ruler 1 and 2 is flush-riveted as at 5ª or otherwise secured a transparent sheet 5 of same length as the ruler but of greater width so as to project somewhat beyond the outer edge of the ruler, as at 5ᵇ. Preferably sheets 5 are made of celluloid or other suitable transparent material.

On the underside of the projecting edge 5ᵇ of each sheet 5 is a scale, or series of graduation 5ᶜ which scale is preferably cut into the material of the sheet, the scale extending substantially the full length of the ruler. The scale of one sheet 5 may conveniently be in inches and the scale on the other sheet 5 may if desired be in centimeters or any other unit of length.

Also, on the under side of each sheet 5 is cut a groove 5ᵈ parallel with the straight edge of the portion 5ᵇ which groove cut all the graduations 5ᶜ including the zero or end marks of each scale. At the intersection of the groove 5ᵈ with the zero mark of each scale is a small hole 5ᵉ for the purpose hereinafter described.

In operation, referring to Fig. 1, supposing a certain end bearing and distance is to be plotted from point W, the protractor P is placed upon the board with its axis P′ on the orientation line L, and the protractor adjusted to give the correct bearing with respect to line L. One of the parallel rulers, such as 2 in Fig. 1, is then brought to bear against the straight edge of the protractor P, and the other parallel ruler 1 adjusted so that the groove 5ᵈ in its graduated edge 5ᵇ overlies the point W. The ruler 2 is then shifted axially until the graduation 5ᶜ (in Fig. 1 graduation 6) overlies the point W, and a sharp pencil or other instrument is inserted into a hole 5ᵉ to make a mark indicating the point Z corresponding with the prescribed bearing and distance from point W. Obviously if a series of bearings and distances were desired to be plotted, a pin could conveniently be used to anchor the center P′ of the protractor P on the orientation line L while permitting rotation of the protractor around point P′. The bearing and distances of such series of points could then be quickly and accurately plotted.

The use of the groove 5ᵈ on the bottom side of sheet 5, with the hole 5ᵉ at the intersection of the groove 5ᵈ and the zero graduation 5ᶜ, greatly increases accuracy in plotting with instruments of the above type, since the groove 5ᵈ being spaced from the edge of the sheet 5 is thereby protected from the indentations and usual irregularities of ordinary straight-edge instruments. Furthermore the use of the groove 5ᵈ and hole 5ᵉ dispenses with the necessity of actually drawing a bearing line through point W and then scaling off the desired length, it being only necessary to shift the rulers until groove $5^d$ and proper graduation $5^c$ overlies the point W and then to prick the zero point Z. It is seldom that a line drawn along a straight edge actually bisects the point intended due to the thickness of the lead of the pencil, and other well-known causes; hence my groove $5^d$ serves to materially increase accuracy in plotting bearings and distances.

I do not limit my invention to the exact form shown in the drawing for obviously changes may be made therein within the scope of the claims.

I claim:

1. In an instrument of the character specified, a base; a transparent sheet secured to the bottom of said base and extending beyond the outer edge thereof; said sheet having a series or graduations adjacent its outer edge, and having a longitudinally disposed line cutting all said graduations; and said sheet having a perforation therein at the intersection of the line and the zero graduation.

2. An instrument of the character specified comprising a pair of parallel rulers; diagonally disposed parallel links pivotally connecting the said rulers; a transparent sheet secured to the bottom face of each ruler, and extending beyond the outer edge of the ruler; each sheet having a series of graduations thereon adjacent its outer edge, and having a longitudinally disposed line cutting all the graduations; and each sheet having a perforation therein at the intersection of the line and zero graduation.

MAXWELL McM. KNECHTEL.